June 2, 1931. R. E. COCHRAN 1,807,965

HUB CAP

Filed April 25 1928 2 Sheets-Sheet 1

Inventor
RAE EUGENE COCHRAN,

Toulmin & Toulmin
Attorneys

Patented June 2, 1931

1,807,965

UNITED STATES PATENT OFFICE

RAE EUGENE COCHRAN, OF COLUMBUS, OHIO, ASSIGNOR TO THE D. L. AULD COMPANY, OF COLUMBUS, OHIO, A CORPORATION OF OHIO

HUB CAP

Application filed April 25, 1928. Serial No. 272,600.

This invention relates to hub caps, and more particularly to that form of hub cap adapted to be used on demountable wheels.

It is a special object of this invention to provide a hub cap that is ornamental in its nature, serviceable in its purpose and may be readily and securely attached to the wheel, and in such a way that it will be permanent and will not interfere with the removal or detachment of the wheel.

It is another object of this invention to provide a hub cap in which there is an improved means by which the hub cap may be securely attached to the wheel by part of a locking means thereon fitting in an opening in the wheel. Further objects of this invention will appear from the following description in connection with the claims, and the illustrations in the drawings.

In the drawings.

Similar reference characters are used throughout the specification and the drawings to represent corresponding parts. A represents a hub cap as a whole and B represents the flange part of the wheel to which the hub cap is directly attached.

Figure 1:
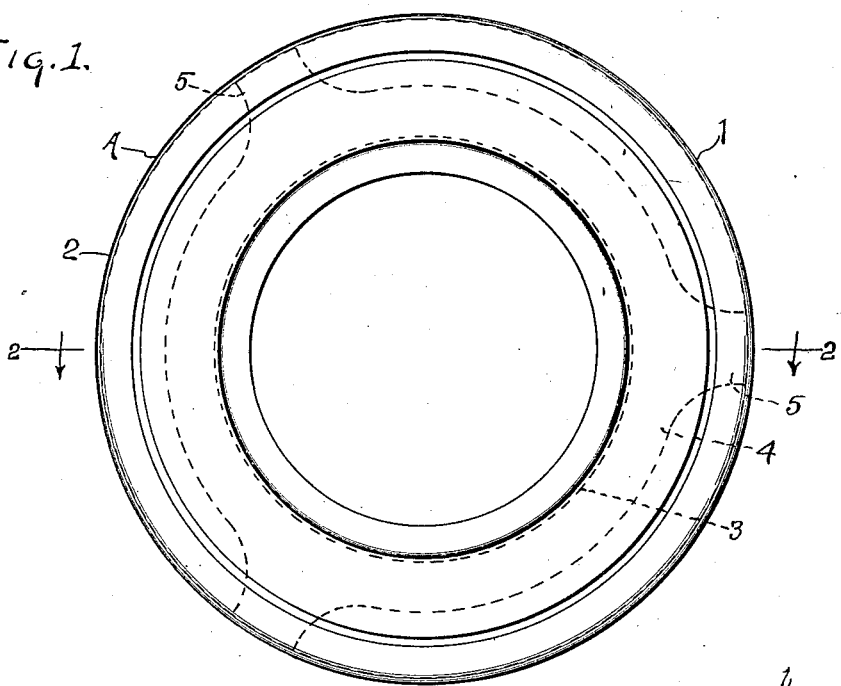
Figure 1 represents a face view of the hub cap, showing in dotted lines the locking means.

The outer part 1 of the hub cap may be constructed in any convenient form, and with any design thereon which is desired. Trade-marks, monograms or other identification means may be used thereon, as indicated in Figure 1 of the drawings. A flange part is bent in, as indicated by the numeral 2, to form a cup structure which is adapted to fit over an opening in the wheel flange or engage the outside part of the wheel on said flange. For the purpose of making the hub cap fit more snugly against the wheel the edge of the flange 2 may be beveled, as indicated by the numeral 2', to fit and closely engage the flange of the wheel.

Figure 2:
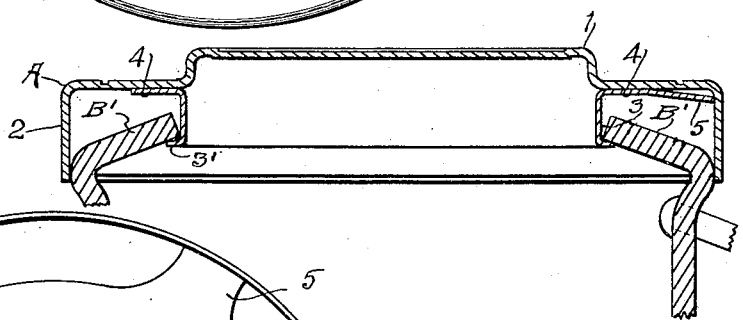
Figure 2 is a cross section of Figure 1 on line 2—2.
Figure 3:
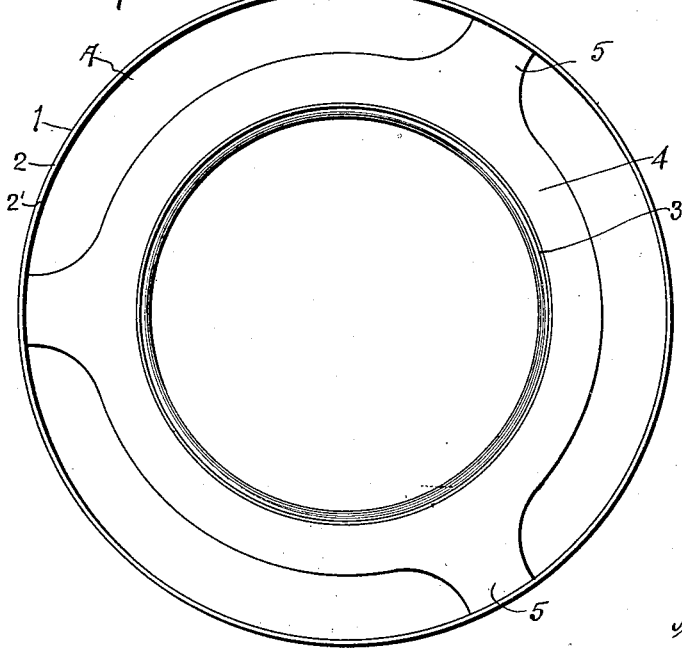
Figure 3 is an inside view of the hub cap shown in Figure 1.

Closely fitting within the hub cap and fastened thereto by any suitable means, such as welding, soldering or otherwise, is a locking ring 3, as shown by Figure 2. This locking ring is made circular in shape and is adapted to fit within the cup part of the hub cap. Extending from the body part of the ring are lip members 5 to engage the flange part of the hub cap to prevent any play or lateral movement of the ring in regard to the hub cap.

The ring part proper of the hub cap is so constructed that it will fit tightly within a circular opening in the flange part of the wheel, and may be flared and made to spring in such a way as to securely engage and hold the flange when it has been forced within the opening in the flange of the wheel.

If more secure attachment is desired than that afforded by friction and the spring action of the locking ring, the locking ring may be spun, as indicated by the numeral 3' in Figure 2, to securely engage and hold the hub cap on the wheel. This form of cap is more especially adapted to that form of wheel having a bulge B' adjacent the hub cap opening.

Figure 4:
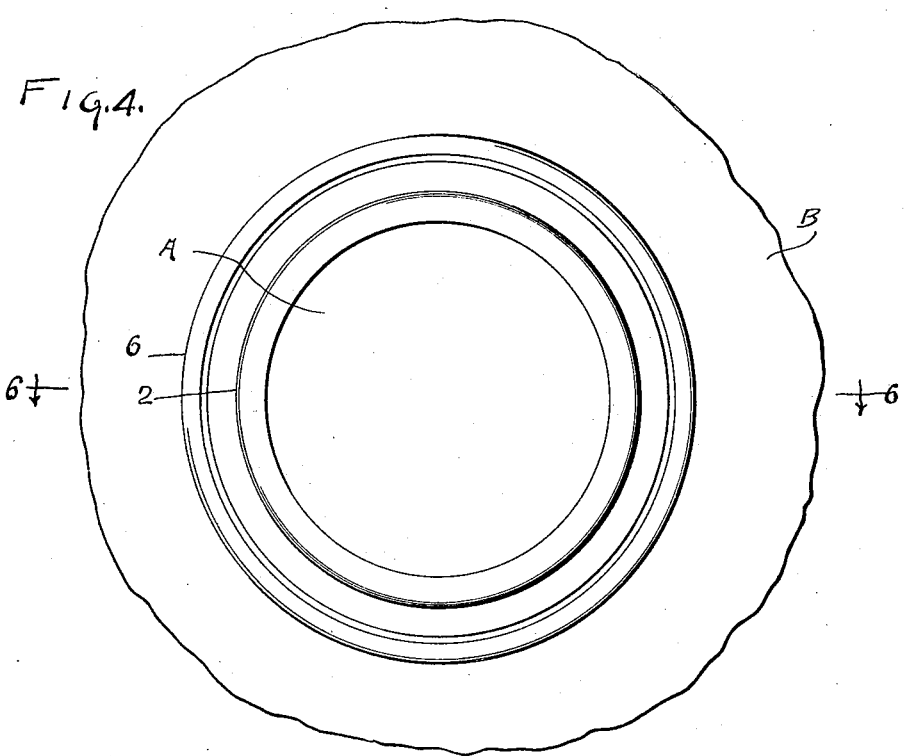
Figure 4 shows a modified form of cap.
Figure 5:
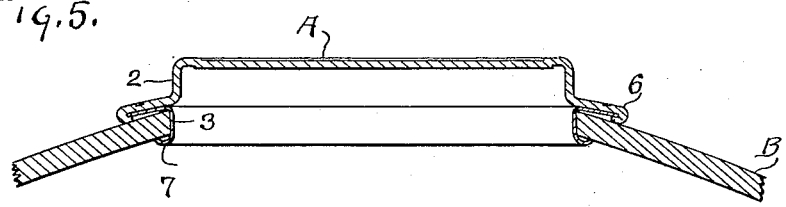
Figure 5 shows a cross section of Figure 4 on the line 6—6.

In the modified form shown in Figures 4 and 5, the flange part 2 shown in Figure 2 may be omitted and the outer edge of the hub cap proper spun under and made to engage the outer part of the locking ring and the wheel flange, as indicated by the numeral 6 of Figure 5.

After this has been done and the locking ring securely attached to the hub cap, the combination is forced into engagement with the flange of the wheel, as indicated by the numeral 7 in Figure 5, and the inside part of the locking ring is spun into firm and secure engagement with the inside part of the wheel flange, thereby forming a secure attachment between the hub cap and the flange of the wheel, preventing displacement and preventing the entry of dust, dirt and other foreign matter within the wheel.

As provided in this form shown in Figures 4 and 5, the locking ring may be attached to the hub cap in other manner than by soldering, or it may simply be held in place by the crimp, as indicated in Figure 5. This form of cap is adapted to be used on wheels in which the outer face near the cap opening is even and not bulged.

By using the ears 5 I prevent any lateral shifting of the locking ring with respect to the hub cap. When such a ring is soldered to the hub cap, the application of heat thereafter in the course of the treatment of the parts, frequently loosens the solder and causes the locking ring to shift, but I have prevented this by having the positioning ears 5 so that even if the solder is melted when it rehardens the ring will be in proper position and will be re-attached in its suitable location.

I desire to comprehend within my invention such modifications as may be clearly embraced within my claims and the scope of my invention.

Having thus fully described my invention, what I claim is new and desire to protect by Letters Patent is set out in the following claims:

1. In a hub cap, a cap member having an annular flat-faced portion and a cylindical wall, a locking ring secured in said cap member, said ring having a plurality of centering projections extending therefrom and engaging the cylindrical wall of the cap member to hold the cap member in position on the ring, and means to engage the hub to lock the cap to the hub.

2. In a hub cap, a cap member having an annular flat-faced portion and a cylindrical wall, and a locking ring secured therein, said ring having an annular flat portion engaging the flat face of the cap member and radial centering projections extending therefrom and engaging the cylindrical wall of the cap member, and a turned-up portion to engage the hub to lock the cap to the hub.

3. In a hub cap, a cap member having an annular flat-faced portion and a cylindrical wall and a locking ring secured therein, said ring having an annular flat portion with centering projections extending therefrom and engaging the cylindrical wall of the cap member to support the cap, and a turned-up portion fitting in the hub and turned over to engage the hub and hold the cap on the hub.

In testimony whereof, I affix my signature.

RAE EUGENE COCHRAN.